March 19, 1968     G. H. THIESS     3,374,436
SPECTRUM ANALYZER INCLUDING A TUNED BAND-PASS FILTER
Filed March 9, 1965
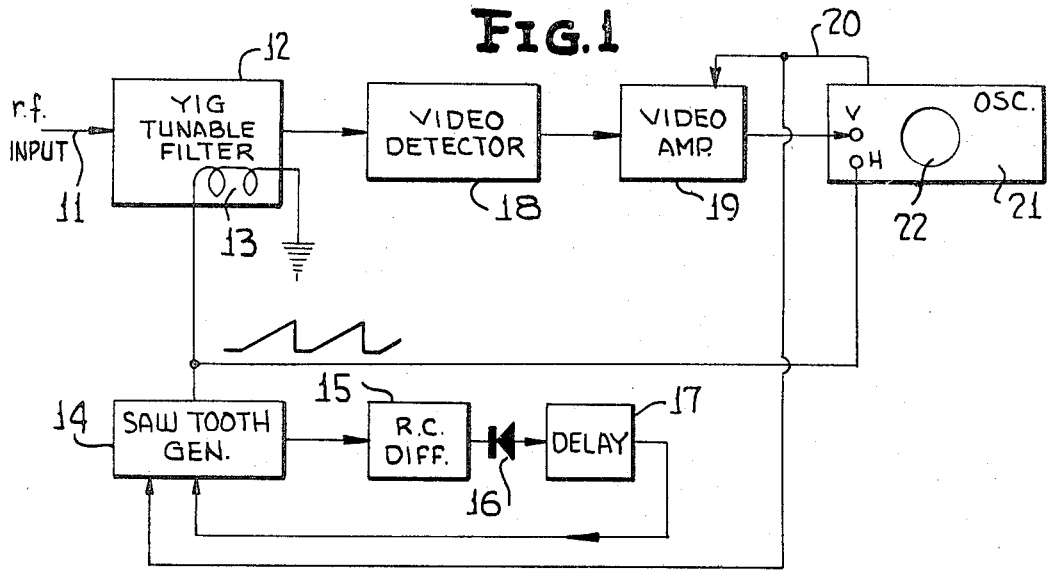
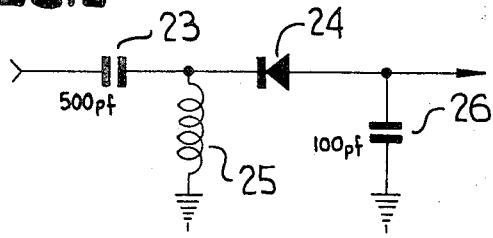
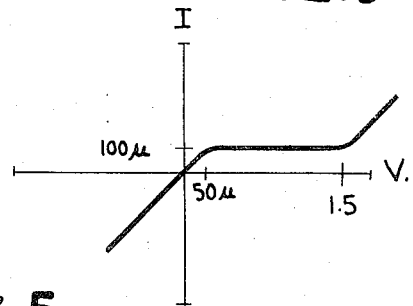
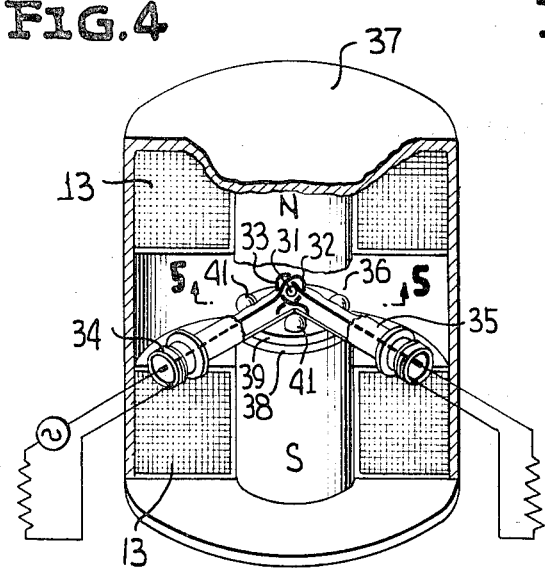
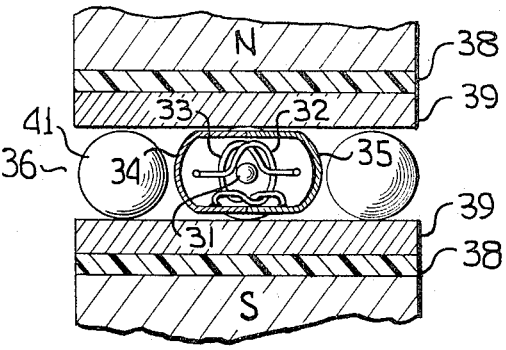
INVENTOR
GEORGE H. THIESS
BY Hurvitz & Rose
ATTORNEYS

United States Patent Office 3,374,436
Patented Mar. 19, 1968

3,374,436
SPECTRUM ANALYZER INCLUDING
A TUNED BAND-PASS FILTER
George H. Thiess, Dallas, Tex., assignor, by mesne assignments, to Melpar, Inc., Falls Church, Va., a corporation of Delaware
Filed Mar. 9, 1965, Ser. No. 438,340
14 Claims. (Cl. 325—336)

The present invention relates generally to scanning spectrum analyzers and, more particularly, to an R.F. spectrum analyzer employing an electronically tuned filter having its center frequency varied to respond to the precession rate of the magnetic moment of crystal molecules in a ferrimagnetic, electrically insulating material.

Scanning spectrum analyzers have generally fallen into two types; namely, superheterodyne and passive detection with mechanical tuning. The superheterodyne analyzers are costly and quite complex, requiring mixers and I.F. amplifiers responsive to only one side band of the mixer. In addition, the commercially available devices have usually employed a built in oscillograph, a costly item by itself. Systems utilizing mechanical tuning, on the other hand, are relatively simple and inexpensive, but possess extremely low sweep rates and have poor reliability. According to the present invention, there is provided a new and improved spectrum analyzer that is considerably less expensive than the prior art superheterodyne analyzers due to its less complex construction. In addition, the analyzer of the present invention has reliability that is on an order of magnitude greater than superheterodyne analyzers.

The analyzer of the present invention, which is adapted to be mounted on the chassis of and derive its input power from commercially available oscilloscopes, includes a band-pass filter that is electronically tunable over an R.F. range in excess of 5:1. The extremely wide tuning range, which enables wide band spectrums, e.g. from 0.5 to 5.0 gc., to be analyzed is attained by employing as a tuned resonant element a crystal, e.g. yttrium-iron-garnet (YIG), having its magnetic moment precession rate controlled in response to the magnitude of a "steady" magnetic field. Varying the "steady" magnetic field in response to a relatively slowly varying sweep current changes the magnetic moment precession rate to sweep the filter center frequency over the spectrum of interest.

A feature of the invention whereby the stated center frequency variations are attained resides in the apparatus employed for coupling R.F. signals to the resonant crystal; namely, the use of input and output co-axial cables having their center conductors terminating in single turn loops directed at right angles to each other. The "steady" magnetic field is coupled so that it is at right angles to the fields associated with the loops. This construction provides, at the magnetic moment precession frequency, a low impedance having virtually no imaginary component between the loops. The impedance remains low over a relatively broad band, 15 mc. at 2 gc. in one embodiment, but increases at the relatively rapid rate of 6 db/per octave outside the band-pass range.

A further feature of the invention is the use of a highly sensitive backward tunnel diode detector that, together with the electromagnetically tuned band-pass filter employed, eliminates the need for R.F. amplification of the spectrum being analyzed. A backward tunnel diode has superior sensitivity to the crystal, point contact diodes previously employed in scanning spectrum analyzers because it provides substantial output for low voltage inputs. Conventional point contact diode detectors attenuate severely all voltages below their barrier voltage so that the R.F. signal being analyzed must be amplified prior to being coupled to them. In a wide band spectrum analyzer, such as is considered in the present instance, R.F. amplifiers should be avoided because they affect differently the several frequency components over the analyzed band, i.e. an amplifier having a pass band of one octave has a different response at one frequency in the pass band from the response at a different frequency in the band. If a different response to the several frequencies over the swept spectrum is provided, the output information is of relatively little value.

The use of a backward diode detector in combination with the YIG has been found to provide extremely constant response over the entire spectrum. This result is achieved because the YIG filter possesses a slight droop in its amplitude response for the low frequencies while the detector has a similar insertion loss at the high frequency end of the scanning range. Cascading the filter with the detector provides almost perfect compensation for the opposite characteristics.

The YIG filter, due to its inherent amplitude limiting characteristics that occur because the maximum magnetic precessing angle can not achieve a predetermined magnitude, serves as a protection device for the detector. Since the filter output cannot exceed a predetermined magnitude, the possibility of diode destruction or long term degradation from being over driven is obviated.

It is accordingly, an object of the present invention to provide a new and improved R.F. scanning spectrum analyzer.

Another object of the invention is to provide a wide band scanning spectrum analyzer requiring no R.F. amplification for most applications.

It is another object of the invention to provide a wide band scanning spectrum analyzer that employs a tuned band-pass filter having as a resonant element a crystal with a precessing magnetic moment.

An additional object of the invention is to provide a scanning spectrum analyzer employing a backward tunnel diode detector so that the analyzer is highly sensitive.

A further object of the invention is to provide a scanning spectrum analyzer that: is inexpensive; can be swept at relatively fast rates; is not particularly complex; is reliable; and is adapted for use with existing cathode ray oscilloscopes.

The above and still further objects, features and advantages of the present invention will become apparent upon consideration of the following detailed description of one specific embodiment thereof, especially when taken in conjunction with the accompanying drawings, wherein:

FIGURE 1 is a block diagram of a preferred embodiment of the invention;

FIGURE 2 is a circuit diagram showing the detector of FIGURE 1;

FIGURE 3 is a plot of the characteristics of the diode shown in FIGURE 2;

FIGURE 4 is a schematic showing of the tunable YIG filter employed in FIGURE 1; and FIGURE 5 is an enlarged view of a portion of the filter of FIGURE 4.

Reference is now made to FIGURE 1 wherein an R.F. spectrum to be analyzed is applied via lead 11, directly from an antenna or any other suitable source, to the system of the present invention. In typical embodiments of the invention, as actually constructed, the R.F. spectrum extended between 2.0 and 12 gc. or between 0.5 and 5.0 gc.

The signal on lead 11 is applied to the input of electronically tunable R.F. band-pass filter 12 that preferably includes a yttrium-iron-garnet (YIG) filter element. The center frequency of filter 12 is varied over the specified limits of the spectrum on lead 11 in response to the sawtooth current input applied to winding 13 by generator 14 that has a high output impedance. The filter 12 center frequency is directly proportional to the low frequency or "steady" magnetic field variations that occur in response to the current applied to winding 13. For the YIG filter employed, where scanning is from 2.0 to 12 gc., a bandwidth of 15 mc. between the 3 db points throughout the scanning range is obtained while the 0.5 to 5.0 gc. scanned YIG filter has a band-pass between its 3 db points of approximately 5 mc. In both filters, the attenuation rate is 6 db/octave outside the pass band.

Because of the relatively large fields necessary to tune YIG filter 12 over the ranges specified, the field in coil 13 at the end of each sawtooth cycle cannot collapse immediately. It is necessary that complete collapse of the field in coil 13 occur prior to each sweep so that the filter center frequency is identical at the beginning of each tuning cycle and thereafter. This is accomplished by providing a dead band between the trailing edge of each sawtooth wave and the beginning of the ramp for the next sawtooth. Typically, it takes 0.5 millisecond for the field of coil 13 to collapse completely, but as a safety factor, the dead band period is adjusted to be approximately 2.0 milliseconds.

To provide the required dead band, sawtooth generator 14 is of the triggered type wherein its output current varies linearly from zero amperes to the maximum value, on the order of 0.5 to 2.0 amperes, depending on the band swept by filter 12. Upon reaching the designed maximum current, the sawtooth generator output returns quickly to zero. In response to the sawtooth trailing edge, when its output current drops suddenly to zero, R.C. differentiator 15 derives a negative spike that is passed by diode 16 to delay network 17. Diode 16 blocks passage of the low amplitude positive output of differentiator 15 that occurs in response to the transition from the zero level output to the linear variation of the sawtooth. The negative spike passes through 2 millisecond delay network 17, and is therefore applied as the trigger input for sawtooth generator 14 to initiate another cycle of generator 14.

The sweep period of each cycle of sawtooth generator 14 can be adjusted, in a well known manner, to vary from approximately 12 to 75 milliseconds.

The R.F. output of YIG filter 12 is applied to detector 18, of the backward tunnel diode type. Detector 18 includes a high pass filter to prevent application to the rectifying diode of the low frequency sweep components deriving from filter 12. Hence, the D.C. output of detector 18, is indicative of only signal amplitude for a particular frequency of the R.F. input and is not masked by interference from the sawtooth generator. A backward tunnel diode configuration is employed for detector 18 because it has low output impedance, on the order of 100 to 200 ohms and high sensitivity, wherein, one microwatt input provides approximately a 500 mv. output. Sensitivity is so great that for most applications there is no need for a microwave amplifier in the front end of the system.

The D.C. output of detector 18 is applied to low noise, A.C. transistor amplifier 19 having a band-pass between 5 cps. and 30 kc. The output of amplifier 19 is applied as a positive going signal to the vertical deflection input terminal of a conventional, commercially available oscilloscope 21, such as any one of Tektronix models 530, 540 or 550.

The output of sawtooth generator 14 is applied as a sweep input to the horizontal deflection input terminal of oscilloscope 21. Since the center frequency of filter 12 and the level of the sawtooth are directly related, there is provided on the face of the oscilloscope cathode ray tube 22 a representation of signal amplitude vs. frequency over the scanned frequency range.

The entire spectrum analyzer unit including filter 12, detector 18, amplifier 19, as well as sawtooth generator 14 and its associated circuitry is packaged as a plug-in unit for the Tektronix oscilloscope models specified. Power for the various components is derived directly from the power supplies contained in oscilloscope 21 by using interface circuits specified by the oscilloscope manufacturer, as denoted by lead 20.

In operation, sawtooth generator 14 varies the center frequency of filter 12 so that at any instant approximately 0.2% of the scanned spectrum on lead 11 can be passed to detector 18. All other frequency components are substantially rejected by filter 12 so that the R.F. signal level applied to detector 18 is a replica of the R.F. signal on lead 11 over the band-pass of filter 12, as determined by generator 14. Detector 18 rectifies the A.C. signal deriving from filter 12 and includes means for integrating the rectified wave to provide a D.C. signal that is proportional to the energy in the particular pass band at any instant. The D.C. signal is amplified and applied to oscilloscope 21 to provide a visual representation of amplitude versus frequency.

Reference is now made to FIGURE 2, wherein there is illustrated a circuit diagram of a preferred embodiment for detector 18. The entire detector is physically mounted in a co-axial line that extends between filter 12 and amplifier 19. The R.F. output signal of filter 12 is fed through coupling capacitor 23 to the cathode of backward tunnel diode 24. The cathode of diode 24 is returned to ground through choke coil 25, which in combination with capacitor 23 attenuates almost completely the audio components that occur in the output of filter 12 due to sweeping in response to sawtooth generator 14. The impedance of capacitor 23 and coil 25 to the R.F. output of filter 12 is such that the entire R.F. spectrum passing through the filter is coupled to diode 24. Shunting the anode of diode 24 is integrating capacitor 26, across which is developed the detected low frequency signal having an amplitude proportional to the frequency components of the R.F. signal on lead 11 that are passed by filter 12.

The operation of detector 18 can best be appreciated from the backward diode characteristic curve of FIGURE 3. As seen from the characteristic curve, a high impedance inflection subsists at approximately 100 microamperes at voltages from about 50 microvolts to 1.5 volts when diode 24 is forward biased, i.e., when its anode voltage is greater than its cathode. The diode impedance for this voltage range is sufficiently great so that the diode can be considered as cut-off.

The diode impedance for this voltage range is relatively small and constant when its anode cathode voltage drops below 50 microvolts, even into the back bias condition. In consequence, back biasing diode 24 by small voltages results in fairly appreciable output currents and these currents are substantially linear with input; in contrast with the exponential characteristics of a crystal diode wherein substantial changes of voltage less than the barrier voltage result in very small increments of output current. Because the backward diode develops appreciable current for low input voltages, the output impedance of detector 18 is on the order of 100 to 200 ohms, in contrast with the typical 5000 to 10,000 ohm output of point contact detectors for voltages less than approximately 0.7 volt.

In operation, the application of a null voltage to diode 24 results in zero output current. During positive half cycles the R.F. wave deriving from filter 12, diode 24 is driven into the third quadrant of FIGURE 3 to provide positive output current pulses having substantial amplitudes responding to the R.F. excursions. In response to the negative half cycles of the R.F. wave deriving from filter 12, diode 24 is driven to its high impedance state and no substantial output current is fed to capacitor 26. The capacitor integrates the positive current pulses supplied to it by diode 24 to provide a signal proportional to the envelope of the R.F. output from filter 12.

Reference is now made to FIGURES 4 and 5 of the drawings wherein a preferred embodiment for YIG filter 12 is illustrated. The filter comprises YIG sphere 31 positioned, by any suitable means (not shown), in the common plane of single turn loops 32 and 33, while lie in planar surfaces orthogonal to each other. Loops 32 and 33, which enable attainment of the extremely wide tuning range alluded to previously, are connected from the center conductors of co-axial cables 34 and 35, respectively, to the outer conductor of the cables at ground potential. Co-axial cable 34 is responsive to the R.F. input signal on lead 11, while cable 35 feeds the filtered wave to detector 18.

To provide the "steady" magnetic field that must penetrate YIG sphere 31 in a plane orthogonal to the magnetic fields associated with loops 32, 33, the intersection of cables 34 and 35 is placed in air gap 36 of permanent magnet 37. To maintain the magnetic field in gap 35 aligned precisely in the plane orthogonal to the magnetic fields associated with loops 32, 33, resilient, non-magnetic spacers 38 are bonded to the edges of magnet 37 where the north and south poles are concentrated. Spacers 38 are covered by high permeability pole piece caps 39 that are separated by non-magnetic spherical spacers 41, all of which have exactly the same diameters. The construction employed insures that the magnetic flux lines in gap 36 remain constantly orientated relative to the faces of pole pieces 39, despite any changes in size of the magnet structure due, for example, to temperature effects. This is evident because spherical spacers 41 always have the same diameters, whereby the thicknesses of resilient spacers 37 change to accommodate variations of magnet volume.

The permanent magnet bias employed is attractive because it reduces the current required from generator 14 to tune filter 12. The D.C. magnetic field established in YIG sphere 31 by permanent magnet 37 is modified by the changing magnetic field resulting from application of sweep current to coil 13 that is mounted on the legs of permanent magnet 37 on either side of gap 36.

As is known, a ferrimagnetic, electrically insulating crystalline material, such as YIG, possesses a net magnetic moment in each crystal molecule. The magnetic moments are aligned with the "steady" magnetic field existing in gap 37. In response to the R.F. magnetic field deriving from loop 32, the crystal magnetic moment precesses about the "steady" field at a rate determined by the "steady" field magnitude and fundamental constants of the material, e.g. its internal anisotropy field and the gyromagnetic ratio of an electron.

If YIG sphere 31 is not disposed between loops 32 and 33, there is no substantial magnetic coupling between the loops since they lie in orthogonal planes. At the precessing frequency, the magnetic moment in YIG sphere 31 enables substantial magnetic coupling to be achieved between the loops. At this frequency, the YIG is considered as resonant and functions as a band-pass filter. By varying the "steady" magnetic field applied to YIG sphere 31 in response to the output current of sawtooth generator 14, the magnetic moment precession rate varies to change the band-pass filter center frequency in a linear manner over the specified wide band.

While I have described and illustrated one specific embodiment of my invention, it will be clear that variation of the details of construction which are specifically illustrated and described may be resorted to without departing from the true spirit and scope of the invention as defined in the claims.

I claim:

1. A scanning spectrum analyzer for deriving information indicative of the frequency components of an R.F. signal over a predetermined relatively wide frequency band, a tunable band-pass filter responsive to said R.F. signal, said filter including a crystal having molecules with magnetic moments precessed at a rate determined by a magnetic field applied thereto, means for applying a time variable magnetic field to said crystal to scan the center frequency of said filter through said frequency band, and detector means responsive to the R.F. signal deriving from said filter for providing a D.C. signal level indicative of the R.F. components passed through said filter.

2. The analyzer of claim 1 wherein said detector includes a backward tunnel diode.

3. A scanning spectrum analyzer for deriving information indicative of the frequency components of a received R.F. signal over a predetermined relatively wide frequency band comprising a tunable band-pass filter directly responsive to said R.F. signal, said filter including a crystal having molecules with magnetic moments precessed at a rate determined by a magnetic field applied thereto, means for applying a time variable magnetic field to said crystal to scan the center frequency of said filter through said frequency band, and backward tunnel diode detector means directly responsive to the R.F. signal deriving from said filter for providing a D.C. signal level indicative of the R.F. components passed through said filter, wherein said D.C. signal is derived without R.F. amplification between the input point of said R.F. signal and the output of said detector.

4. The analyzer of claim 3 wherein said crystal is comprised of yttrium-iron-garnet.

5. The analyzer of claim 4 wherein said means for applying a time variable magnetic field to said crystal includes a current source of substantially saw tooth repetitive wave-forms, a coil coupled to said crystal responsive to said current source having a dead band period between adjacent periods of said waveforms, said dead band period being sufficient to enable the current in said coil to return to its quiescent level prior to the beginning of the next saw tooth waveform.

6. The analyzer of claim 5 wherein said filter includes a permanent magnet having said coil wound thereon and an air gap for providing said magnetic field, said crystal being disposed in said air gap, a pair of loops disposed in orthogonal planes to each other being coupled about said crystal and having associated magnetic fields extending in a plane orthogonal to the plane of said time varying magnetic field, one of said loops coupling the R.F. signal to said crystal, the other of said loops coupling the R.F. signal deriving from the filter to said detector means.

7. The analyzer of claim 6 wherein the air gap of said permanent magnet is formed by a pair of pole pieces having faces lying in parallel planes, means for maintaining the faces in parallel planes comprising a resilient layer between the edges of said magnet proximate said air gap and said pole pieces, and a plurality of non-magnetically permeable spacers in said gap contacting the faces of the pole pieces.

8. The analyzer of claim 5 wherein said filter includes a pair of loops disposed in orthogonal planes to each other being coupled about said crystal and having associated magnetic fields extending in a plane orthogonal to the plane of said time varying magnetic field, one of said loops coupling the R.F. signal to said crystal, the other of said loops coupling the R.F. signal deriving from the filter to said detector means.

9. The analyzer of claim 5 wherein said detector includes a high pass filter for preventing application to the detector of low frequency signals deriving from said filter in response to said saw tooth wave.

10. An R.F. scanning spectrum analyzer for deriving information indicative of the frequency components of an R.F. signal over a predetermined band and adapted to be connected with an oscillograph having first and second sets of orthogonal cathode ray beam deflecting means and an internal power supply comprising a tunable band pass filter responsive to said R.F. signal, said filter including a YIG crystal having molecules with magnetic moments precessed at a rate determined by a magnetic field applied thereto, a source of scanning signal, means responsive to said scanning signal for applying a time varying magnetic field to said crystal to scan the filter center frequency through said frequency band, means responsive to said scanning signal for applying a voltage indicative of the crystal center frequency to said first set of deflecting means, a backward tunnel diode detector responsive to the R.F. output of said filter for deriving a D.C. signal level indicative of the R.F. components passed through said filter, an A.C. amplifier responsive to the signal level deriving from said detector, means responsive to the signal deriving from said amplifier for applying a voltage indicative of the R.F. frequency components passing through the filter to the second set of deflecting plates, and means for supplying power from said oscillograph to the power input terminals of said amplifier and said scanning signal source.

11. An R.F. scanning spectrum analyzer for deriving information indicative of the frequency components of an R.F. signal over a predetermined band and adapted to be connected with an oscillograph having first and second sets of orthogonal cathode ray beam deflecting means and an internal power supply comprising a tunable band-pass filter responsive to said R.F. signal, said filter including a ferrimagnetic crystal having molecules with magnetic moments precessed at a rate determined by a magnetic field applied thereto, a source of scanning signal, means responsive to said scanning signal for applying a time varying magnetic field to said crystal to scan the filter center frequency through said frequency band, means responsive to said scanning signal for applying a voltage indicative of the crystal center frequency to said first set of deflecting means, a detector responsive to the R.F. output of said filter for deriving a D.C. signal level indicative of the R.F. components passed through said filter, an amplifier responsive to the signal level deriving from said detector, means responsive to the signal deriving from said amplifier for applying a voltage indicative of the R.F. frequency components passing through the filter to the second set of deflecting plates, and means for supplying power from said oscillograph to the power input terminals of said amplifier and said scanning signal source.

12. A filter comprising a ferrimagnetic crystal having molecules with magnetic moments precessed at a rate determined by a magnetic field applied thereto, a permanent magnet having an air gap for providing said magnetic field, said crystal being disposed in said air gap, a pair of loops disposed in orthogonal planes to each other being coupled about said crystal and having associated magnetic fields extending in a plane orthogonal to the plane of said magnetic field of said permanent magnet.

13. The filter of claim 12 further including coils wound on said permanent magnet for varying the magnetic field of said magnet in said gap.

14. The filter of claim 12 wherein the air gap of said permanent magnet is formed by a pair of pole pieces having faces lying in parallel planes, means for maintaining the faces in parallel planes comprising a resilient layer between the edges of said magnet proximate said air gap and said pole pieces, and a plurality of non-magnetically permeable spacers in said gap contacting the faces of the pole pieces.

References Cited

UNITED STATES PATENTS 3,017,573    1/1962    Hoffman _____ 325—336 XR
3,065,434    11/1962    Calderhead _____ 333—70
3,309,628    3/1967    Olson.

WILLIAM C. COOPER, *Primary Examiner.*

R. S. BELL, *Assistant Examiner.*